(12) United States Patent
Kim et al.

(10) Patent No.: US 9,886,912 B2
(45) Date of Patent: Feb. 6, 2018

(54) DISPLAY APPARATUS

(71) Applicant: SAMSUNG DISPLAY CO., LTD., Yongin-si, Gyeonggi-do (KR)

(72) Inventors: Byungsun Kim, Suwon-si (KR); Jaehyun Cho, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 304 days.

(21) Appl. No.: 14/866,656

(22) Filed: Sep. 25, 2015

(65) Prior Publication Data
US 2016/0284301 A1 Sep. 29, 2016

(30) Foreign Application Priority Data

Mar. 24, 2015 (KR) .................... 10-2015-0040965

(51) Int. Cl.
*G06F 1/00* (2006.01)
*G09G 3/34* (2006.01)
(Continued)

(52) U.S. Cl.
CPC ............. *G09G 3/3413* (2013.01); *G02F 1/13* (2013.01); *G09G 3/3426* (2013.01);
(Continued)

(58) Field of Classification Search
CPC .............. G09G 3/3413; G09G 5/04; G09G 2320/0626; G09G 2320/0247; G09G 3/36; G09G 5/10; G06F 1/00
See application file for complete search history.

(56) References Cited

U.S. PATENT DOCUMENTS

| 8,456,413 B2 | 6/2013 | Furukawa et al. |
| 2012/0007900 A1* | 1/2012 | Murai ................. G09G 3/3413 345/690 |
| 2013/0342430 A1* | 12/2013 | Huang ................ G09G 3/3406 345/88 |

FOREIGN PATENT DOCUMENTS

| KR | 10-0596969 B1 | 7/2006 |
| KR | 10-1252089 B1 | 4/2013 |
| KR | 10-2013-0062198 A | 6/2013 |

OTHER PUBLICATIONS

Korean Patent Abstracts for Korean Publication No. 10-2000-0073682 A, May 12, 2000, Corresponding to Korean Patent No. 10-0596969 B1, Jul. 4, 2006, 1 Page.
(Continued)

*Primary Examiner* — Michael Faragalla
(74) *Attorney, Agent, or Firm* — Lewis Roca Rothgerber Christie LLP

(57) ABSTRACT

A display apparatus includes: a signal controller to generate first to fourth image data from first to third input image signals; a pixel to subsequently receive first to fourth data voltages corresponding to the first to fourth image data during first to fourth subframe periods; a backlight including first to third light emitting elements configured to generate light of first to third colors, respectively; and a backlight driver. The backlight driver is to selectively switch the first to third light emitting elements based on color information of the first to fourth image data, to turn on at least one of the first to third light emitting elements during each of the first to fourth subframe periods, and to switch the first to third light emitting elements to provide light of a same color to the pixel during two subframe periods from among the first to fourth subframe periods.

19 Claims, 11 Drawing Sheets

(51) Int. Cl.
*G09G 5/04* (2006.01)
*G02F 1/13* (2006.01)
*G09G 3/36* (2006.01)

(52) U.S. Cl.
CPC ............. *G09G 3/3648* (2013.01); *G09G 5/04* (2013.01); *G09G 2310/0235* (2013.01); *G09G 2320/0247* (2013.01); *G09G 2320/0626* (2013.01); *G09G 2320/0646* (2013.01)

(56) References Cited

OTHER PUBLICATIONS

Korean Patent Abstracts for Korean Publication No. 10-2008-0002301 A, Jan. 4, 2008, Corresponding to Korean Patent No. 10-1252089 B1, Apr. 12, 2013, 1 Page.

* cited by examiner

DISPLAY APPARATUS

CROSS-REFERENCE TO RELATED APPLICATION

This patent application claims priority to and the benefit of Korean Patent Application No. 10-2015-0040965, filed on Mar. 24, 2015, the entire content of which is hereby incorporated by reference.

BACKGROUND

One or more aspects of example embodiments of the present disclosure relate to a display apparatus, and more particularly, to a display apparatus having improved display quality.

Typically, a liquid crystal display apparatus includes a liquid crystal display panel for displaying an image by using the light transmittance of liquid crystals and a backlight unit disposed under the liquid crystal display panel to provide light to the liquid crystal display panel.

Recently, a dimming technique of increasing the amount of light transmitted through pixels has been applied. The dimming technique is a control technique of dividing the backlight unit into a plurality of blocks and emitting light with different luminance according to the blocks. The plurality of blocks include light sources for emitting light of different colors.

SUMMARY

One or more aspects of example embodiments of the present disclosure provide a display apparatus having reduced flicker.

According to an example embodiment of the inventive concept a display apparatus includes: a signal controller configured to generate first to fourth image data from first to third input image signals, the first to third input image signals having first to third color information, respectively; a pixel configured to subsequently receive first to fourth data voltages corresponding to the first to fourth image data during first to fourth subframe periods; a backlight including first to third light emitting elements configured to generate light of first to third colors, respectively; and a backlight driver configured to drive the first to third light emitting elements, wherein the backlight driver is configured to selectively switch the first to third light emitting elements based on color information of the first to fourth image data, to turn on at least one of the first to third light emitting elements during each of the first to fourth subframe periods, and to switch the first to third light emitting elements to provide light of a same color to the pixel during two subframe periods from among the first to fourth subframe periods.

In one embodiment, the pixel may be configured to transmit light of the same color as that of light received during the first to fourth subframe periods based on the first to fourth data voltages.

In one embodiment, the pixel may include: a thin film transistor configured to output the first to fourth data voltages; a pixel electrode connected to the thin film transistor; a common electrode configured to form an electric field with the pixel electrode; and a liquid crystal layer configured to change an arrangement corresponding to the electric field.

In one embodiment, the display apparatus may further include an image signal converter configured to generate the first to fourth image data from the first to third input image signals, wherein the image signal converter may be configured to generate two white image data having white information from among the first to fourth image data according to one input image signal having a minimum luminance value from among the first to third input image signals, and to generate other two image data from among the first to fourth image data respectively having corresponding color information from other two input image signals from among the first to third input image signals.

In one embodiment, the other two image data may have color information on different colors from among red, green, and blue colors.

In one embodiment, the two white image data may have the same luminance value.

In one embodiment, the first to third light emitting elements may be configured to generate light of the red, green, and blue colors, respectively.

In one embodiment, light emitting elements that generate light of colors corresponding to the color information of the other two image data from among the first to third light emitting elements may be configured to be turned on during two subframe periods from among the first to fourth subframe periods during which data voltages corresponding to the other two image data are applied to the pixel.

In one embodiment, the first to third light emitting elements may be configured to be concurrently turned on during other two subframe periods from among the first to fourth subframe periods during which data voltages corresponding to the two white image data are applied to the pixel.

In one embodiment, the image signal converter may include: an image signal analyzer configured to analyze luminance values of the first to third input image signals; a signal level determiner configured to determine luminance values of the two white image data from the analyzed luminance values, and to determine luminance values of the other two image data; and a conversion signal generator configured to generate the first to fourth image data based on the determined luminance values.

In one embodiment, the display apparatus may further include an image signal converter configured to generate the first to fourth image data from the first to third input image signals, wherein the image signal converter may be configured to generate one image data having color information on a fourth color different from the first to third colors of the first to third input image signals from among a minimum input image signal having a minimum luminance value from among the first to third input image signals, to generate two image data having the same color information from a maximum input image signal having a maximum luminance value from among the first to third input image signals, and to generate remaining one image data having corresponding color information from a remaining one input image signal from among the first to third input image signals.

In one embodiment, the first to third colors of the first to third input image signals may be red, green, and blue, respectively.

In one embodiment, the two image data having the same color information as the maximum input image signal may have a same luminance value with each other.

In one embodiment, the one image data having the information on the fourth color may have information on a mixed color including the color of the color information of the minimum input image signal and the color of the color information of the remaining one input image signal.

In one embodiment, the first to third light emitting elements may be configured to generate light of the red, green, and blue colors, respectively.

In one embodiment, one light emitting element configured to generate light of a color corresponding to that of the color information of the minimum input image signal and another light emitting element configured to generate light of a color corresponding to that of the color information of the remaining one input image signal from among the first to third light emitting elements may be configured to be concurrently turned on during one subframe period from among the first to fourth subframe periods during which a data voltage corresponding to the image data having the color information on the fourth color is applied to the pixel.

In one embodiment, a remaining one light emitting element configured to generate light of a color corresponding to that of the color information of the maximum input image signal from among the first to third light emitting elements may be configured to be turned on during each of other two subframe periods from among the first to fourth subframe periods during which data voltages corresponding to the two image data having the same color information as the maximum input image signal are applied to the pixel.

In one embodiment, the other two subframe periods may be two discrete periods from among the first to fourth subframe periods.

In one embodiment, the image signal converter may include: an image signal analyzer configured to analyze luminance values of the first to third input image signals; a signal level determiner configured to determine luminance values of the image data having the color information on the fourth color from the analyzed luminance values, to determine luminance values of two image data having the same color information as the maximum input image signal, and to determine a luminance value of the remaining one image data having color information corresponding to the remaining one input image signal; and a conversion signal generator configured to generate the first to fourth image data based on the determined luminance values.

BRIEF DESCRIPTION OF THE DRAWINGS

The above and other features and aspects of the present inventive concept will be more clearly understood from the following detailed description taken in conjunction with the accompanying drawings, in which.

DETAILED DESCRIPTION

Figure 1:
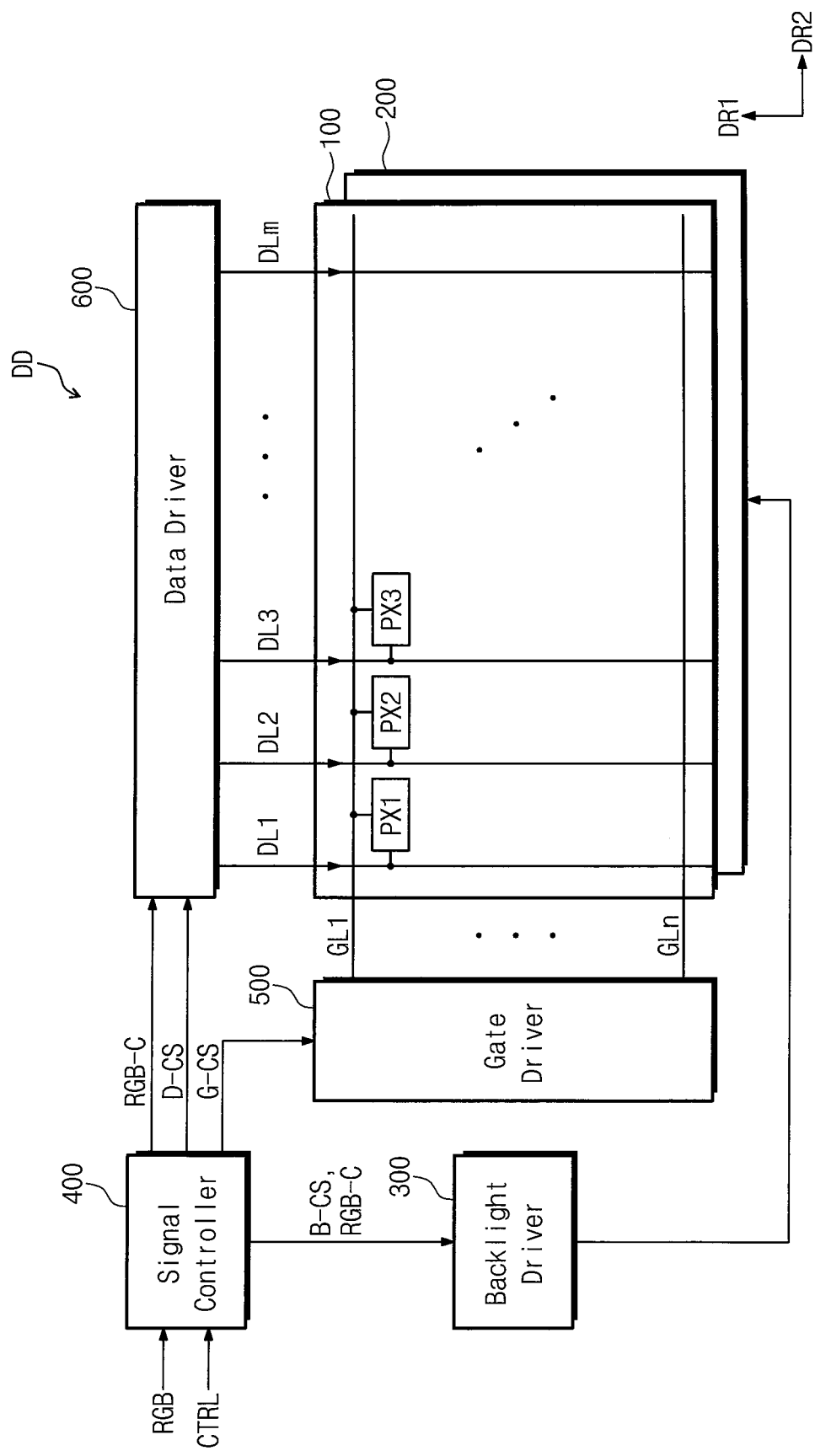
FIG. 1 is a block diagram of a display apparatus according to an embodiment of the inventive concept.

Hereinafter, exemplary embodiments of the inventive concept will be described in more detail with reference to the accompanying drawings.

The inventive concept may, however, be embodied in various different forms and should not be construed as being limited to the exemplary embodiments set forth herein. Rather, these exemplary embodiments are provided so that this disclosure will be thorough and complete, and will fully convey the spirit and scope of the inventive concept to those skilled in the art.

In the drawings, each figure may be partly simplified or exaggerated for clarity of illustration. It is to be noted that in giving reference numerals to components of each of the accompanying drawings, the same components will be denoted by the same reference numerals even though they are shown in different drawings. Further, in describing exemplary embodiments of the inventive concept, well-known constructions or functions may not be described in detail because they may unnecessarily obscure the understanding of the inventive concept.

Figure 2A:
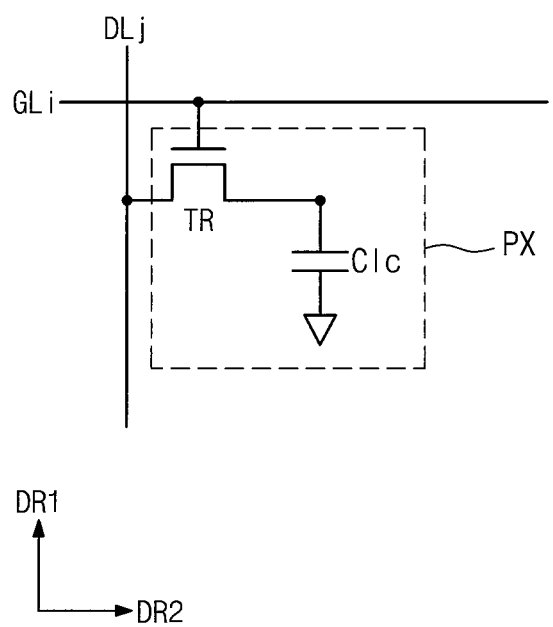
FIG. 2A is an equivalent circuit diagram of a pixel according to an embodiment of the inventive concept.
Figure 2B:
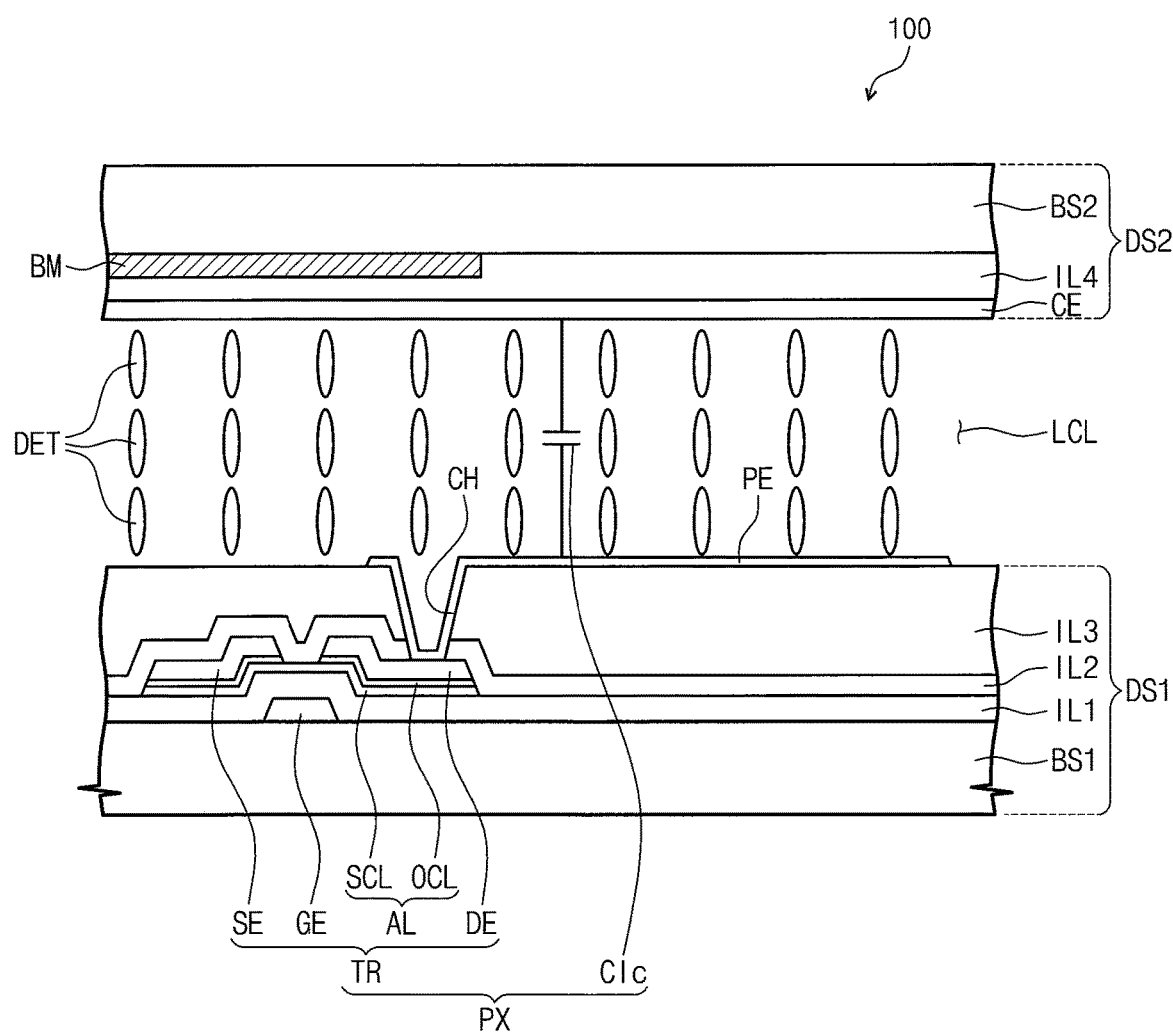
FIG. 2B is a sectional view of the pixel according to an embodiment of the inventive concept.

FIG. 1 is a block diagram of a display apparatus according to an embodiment of the inventive concept. FIG. 2A is an equivalent circuit diagram of a pixel according to an embodiment of the inventive concept. FIG. 2B is a sectional view of the pixel according to an embodiment of the inventive concept.

As shown in FIG. 1, the display apparatus DD includes a display panel 100 for generating images, a backlight unit (or backlight) 200 for supplying light to the display panel 100, and a backlight driver 300 for driving the backlight unit 200. In addition, the display apparatus DD may include a signal controller 400, a gate driver 500, and a data driver 600.

The display panel 100 may be a transmissive display panel, such as a liquid crystal display panel, or a transflective display panel, such as an electrophoresis display panel. However, the display panel 100 is not limited thereto. In this embodiment, the display panel 100 is described as the liquid crystal display panel.

The display panel 100 includes a plurality of gate lines GL1 to GLn, a plurality of data lines DL1 to DLm, and a plurality of pixels PX1, PX2, and PX3. In FIG. 1, three pixels PX1, PX2, and PX3 have been illustrated as an example, but the inventive concept is not limited thereto. The plurality of gate lines GL1 to GLn are arranged with each other along a first direction DR1, and extend in a second direction DR2 crossing the first direction DR1. The plurality of data lines DL1 to DLm extend in the first direction DR1, and are arranged with each other along the second direction DR2. Each of the plurality of pixels PX1, PX2, and PX3 is connected to a corresponding gate line from among the plurality of gate lines GL1 to GLn, and connected to a corresponding data line from among the plurality of data lines DL1 to DLm.

The backlight unit 200 provides light to the display panel 100. The backlight unit 200 may include a plurality of light emitting elements. The plurality of light emitting elements may be divided into light emitting elements that provide light of different colors to the display panel 100. In one embodiment, the backlight unit 200 may be a direct emission backlight unit disposed under the display panel 100.

The backlight driver 300 controls operations of the backlight unit 200. The backlight driver 300 may selectively turn on/off the plurality of light emitting elements, and may provide a power voltage to the plurality of light emitting elements.

The signal controller 400 receives a plurality of input image signals RGB and a plurality of control signals CTRL from the outside of the display apparatus DD. The signal controller 400 converts the plurality of input image signals RGB to be suitable depending on specifications for interface with the data driver 600, and provides the plurality of converted image data RGB-C to the backlight driver 300 and the data driver 600.

The signal controller 400 generates, based on the plurality of control signals CTRL, gate control signals G-CS (e.g., a vertical start signal, a vertical synchronization signal, a vertical clock signal, and a vertical clock bar signal), data control signals D-CS (e.g., an output start signal, a horizontal start signal, a horizontal synchronization signal, and the like), and backlight control signals B-CS (e.g., a clock signal, a vertical synchronization signal, and a horizontal synchronization signal). The data control signals D-CS are provided to the data driver 600, and the gate control signals G-CS are provided to the gate driver 500. The backlight control signals B-CS are provided to the backlight driver 300.

The gate driver 500 sequentially outputs a plurality of gate signals in response to the gate control signals G-CS provided from the signal controller 400. Thus, the plurality of pixels PX1, PX2, and PX3 may be sequentially scanned in units of rows by the plurality of gate signals.

The data driver 600 converts the image data RGB-C into data voltages, and outputs the converted data voltages in response to the data control signals D-CS provided from the signal controller 400. The output data voltages are provided to the plurality of pixels PX1, PX2, and PX3 through the plurality of data lines DL1 to DLm.

Each of the plurality of pixels PX1, PX2, PX3 is turned on by a corresponding gate signal from among the plurality of gate signals provided through a corresponding gate line from among the plurality of gate lines GL1 to GLn. The turned-on pixel receives a corresponding data voltage from the data driver 600.

In FIG. 2A, an equivalent circuit diagram of one pixel PX is illustrated as an example. FIG. 2B shows a sectional view of the pixel according to an embodiment of the inventive concept. In FIGS. 2A and 2B, the pixel PX having a vertical alignment (VA) mode is illustrated as an example, but the operation mode of the pixel PX is not limited thereto. The pixel PX may be a pixel having a patterned vertical alignment (PVA) mode, an in-plane switching (IPS) mode, a fringe-field switching (FFS) mode, a plane-to-line switching (PLS) mode, and/or the like.

As shown in FIG. 2A, the pixel PX includes, for example, a thin film transistor TR and a liquid crystal capacitor Clc. Each of the plurality of pixels PX1, PX2, and PX3 shown in FIG. 1 may have the same or substantially the same equivalent circuit as that of the pixel PX of FIG. 2A. In an embodiment of the inventive concept, the pixel PX may further include a storage capacitor. However, the inventive concept is not limited thereto, and the pixel PX may include any suitable number of transistors and capacitors as known in the art.

The thin film transistor TR is electrically connected to an ith gate line GLi and a jth data line DLj. The thin film transistor TR outputs a pixel voltage corresponding to a data voltage received from the jth data line DLj in response to a gate signal received from the ith gate line GLi.

The liquid crystal capacitor Clc charges the pixel voltage output from the thin film transistor TR. The arrangement of liquid crystal directors DET included in a liquid crystal layer LCL (see FIG. 2B) is changed depending on an amount of electric charges charged in the liquid crystal capacitor Clc. The liquid crystal layer LCL transmits or blocks light incident thereto according to an arrangement of the liquid crystal directors DET.

Referring to FIG. 2B, the display panel 100 includes a first display substrate DS1, a second display substrate DS2, and the liquid crystal layer LCL disposed between the first and second display substrates DS1 and DS2.

The thin film transistor TR is disposed on a surface (e.g., one surface) of a first base substrate BS1. In FIG. 2B, the thin film transistor TR having a staggered structure is illustrated as an example, but the structure of the thin film transistor TR is not limited thereto. For example, in one embodiment, the thin film transistor TR may have a planar structure.

The thin film transistor TR includes a control electrode GE connected to the ith gate line GLi (see FIG. 2A), an active layer AL overlapped with the control electrode GE, an input electrode SE connected to the jth data line DLj (see FIG. 2A), and an output electrode DE spaced apart from the input electrode SE. The active layer AL may include a semiconductor layer SCL and an ohmic contact layer OCL.

First to third insulating layers IL1, IL2, and IL3 are disposed on the surface of the base substrate BS1. The first to third insulating layers IL1, IL2, and IL3 cover or partially cover components of the thin film transistor TR.

The liquid crystal capacitor Clc includes a pixel electrode PE and a common electrode CE. The pixel electrode PE is disposed on the third insulating layer IL3. The pixel electrode PE is connected to the output electrode DE through a contact hole CH penetrating through the second and third insulating layers IL2 and IL3. The arrangement of the liquid crystal layer is changed depending on an electric field formed between the pixel electrode PE and the common electrode CE.

A black matrix BM is disposed on a surface (e.g., one surface) of a second base substrate BS2. A fourth insulating layer IL4 covering the black matrix BM is disposed on the surface of the second base substrate BS2. The common electrode CE is disposed on the fourth insulating layer IL4. A common voltage is applied to the common electrode CE. The common voltage has a different level from that of the pixel voltage. In one embodiment, an alignment layer may be further disposed on each of the first and second base substrates BS1 and BS2.

In one embodiment, the first and second display substrates DS1 and DS2 may not include color filters. Accordingly, the pixel PX may transmit light of a color equal to that of light received thereto. The amount of the transmitted light may be determined according to the level of a pixel voltage applied thereto. The color of the transmitted light may be determined by light provided from a plurality of light emitting elements.

In one embodiment, the pixel PX may receive a pixel voltage a plurality of times during one frame period. Light of different colors from the plurality of light emitting elements may be provided to the pixel PX in synchronization with the time when pixel voltages are applied. This will be described in further detail later.

In one embodiment, any one of the first and second display substrates DS1 and DS2 may include color filters of the same or substantially the same color, which are disposed corresponding to the plurality of pixels PX1, PX2, and PX3. Accordingly, the pixel PX transmits light having a mixed color corresponding to the color of the received light and the color of the color filter.

Figure 3:
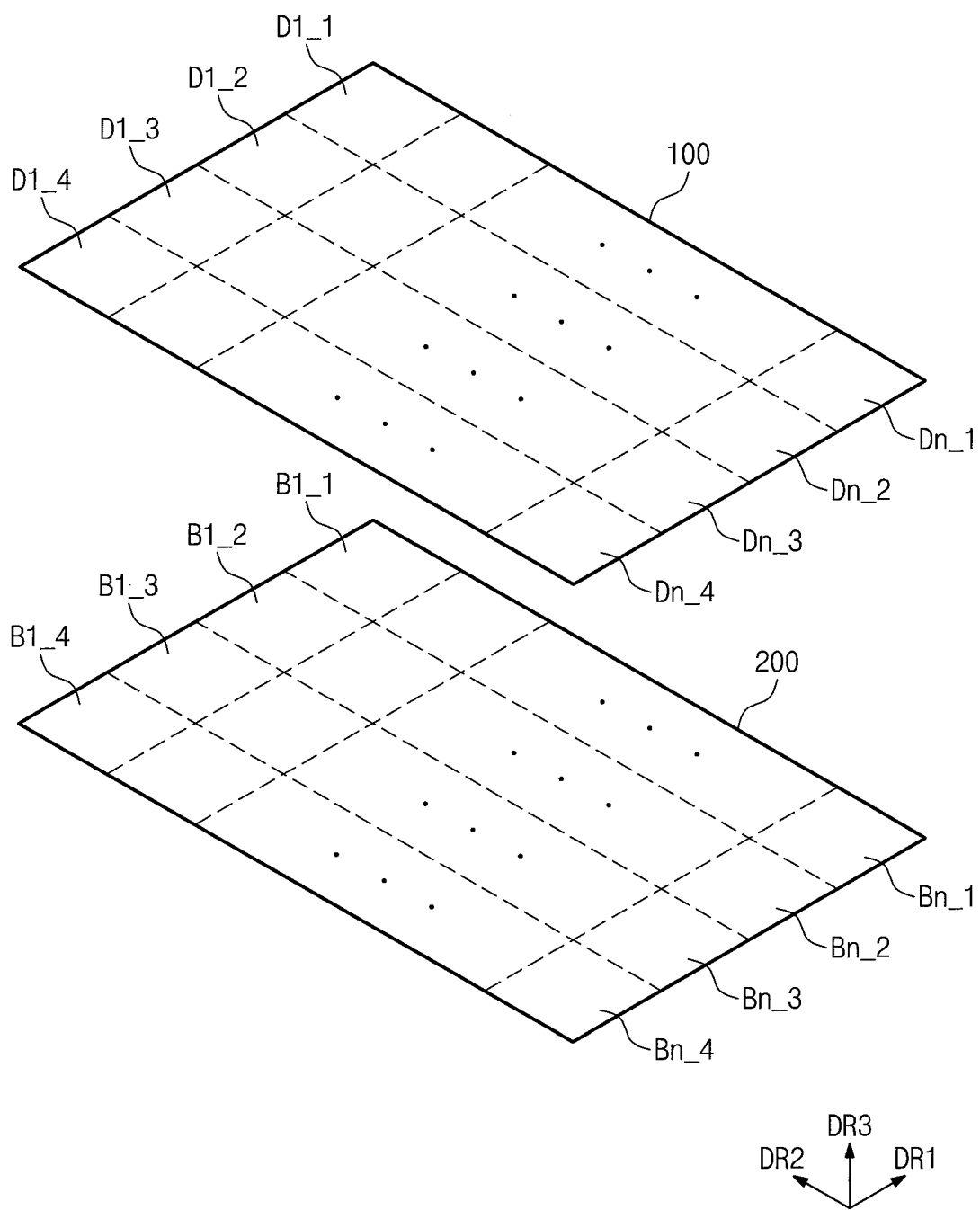
FIG. 3 is a conceptual view partially showing the display apparatus shown in FIG. 1.
Figure 4A:
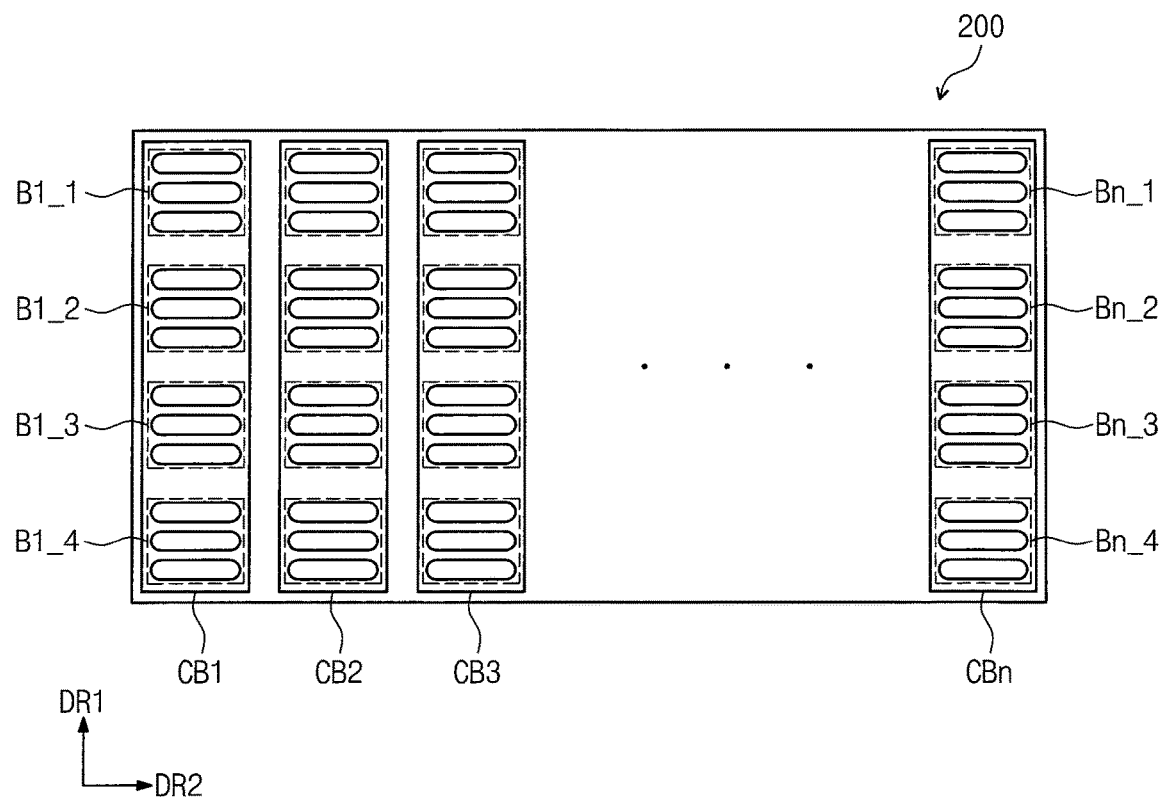
FIG. 4A is a plan view of a backlight unit according to an embodiment of the inventive concept.
Figure 4B:
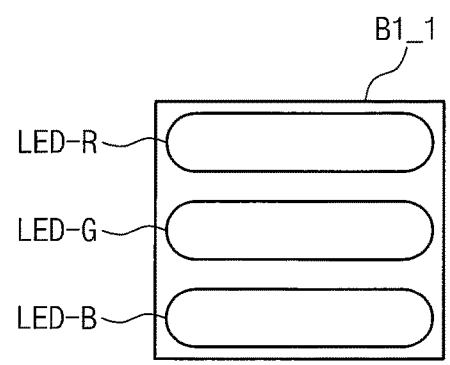
FIG. 4B is a plan view of a light source block according to an embodiment of the inventive concept.

FIG. 3 is a conceptual view partially showing the display apparatus shown in FIG. 1. FIG. 4A is a plan view of a backlight unit according to an embodiment of the inventive concept. FIG. 4B is a plan view of a light source block according to an embodiment of the inventive concept.

Referring to FIG. 3, the display panel 100 may be divided into a plurality of dimming areas D1_1 to Dn_4. The plurality of dimming areas D1_1 to Dn_4 may be arranged in a matrix form. In FIG. 3, the plurality of dimming areas D1_1 to Dn_4 arranged in four rows and n columns is illustrated as an example, but the inventive concept is not limited thereto. Each of the plurality of dimming areas D1_1 to Dn_4 may include at least a plurality of pixels.

The backlight unit 200 may include a plurality of light source blocks B1_1 to Bn_4 arranged corresponding to the plurality of dimming areas D1_1 to Dn_4, respectively. Each of the plurality of light source blocks B1_1 to Bn_4 includes a plurality of light emitting elements. The plurality of light emitting elements may be divided or categorized according to colors of light emitted therefrom.

As shown in FIGS. 4A and 4B, the backlight unit 200 includes a plurality of circuit boards CB1 to CBn and a plurality of light source blocks B1_1 to Bn_4 mounted on the plurality of circuit boards CB1 to CBn. Each of the plurality of circuit boards CB1 to CBn may have a stripe shape extending in the first direction DR1. The plurality of circuit boards CB1 to CBn may be arranged with each other along the second direction DR2.

Each of the plurality of light source blocks B1_1 to Bn_4 may include first to third light emitting elements LED-R, LED-G, and LED-B. In FIG. 4B, one light source block B1-1 is illustrated as an example, but the inventive concept is not limited thereto. Each of the first to third light emitting elements LED-R, LED-G, and LED-B may include a light emitting diode package. The first to third light emitting elements LED-R, LED-G, and LED-B may generate light of first to third colors that are different from one another. In this embodiment, the first to third colors are described as red, green, and blue. However, the inventive concept is not limited thereto, and in another embodiment of the inventive concept, the first to third colors may be, for example, cyan, magenta, and yellow.

Figure 5:
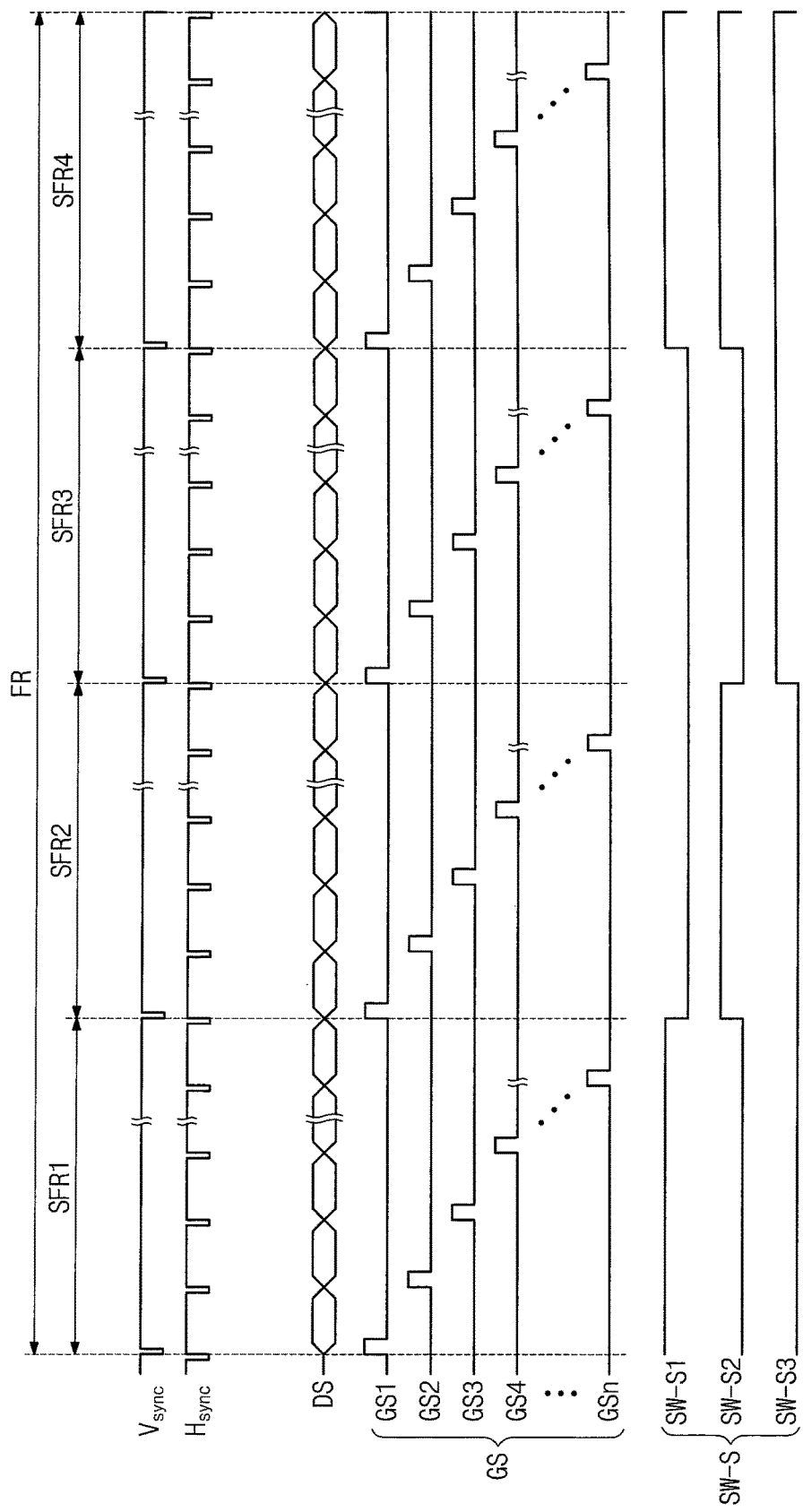
FIG. 5 is a timing diagram of signals generated in a display apparatus according to an embodiment of the inventive concept.

FIG. 5 is a timing diagram of signals generated in the display apparatus according to an embodiment of the inventive concept. In FIG. 5, one frame period FR among a plurality of frame periods is illustrated as an example.

The frame period FR may include first to fourth subframe periods SFR1 to SFR4. In this embodiment, the display apparatus DD may be driven at, for example, about 240 Hz, and may display one frame image during the frame period FR. The display apparatus DD according to this embodiment may display 60 frame images per second.

The gate driver 500 (see FIG. 1) may sequentially output a plurality of gate signals GS1 to GSn (hereinafter, referred to as GS) to the plurality of gate lines GL1 to GLn, respectively, during the first to fourth subframe periods SFR1 to SFR4, based on a vertical synchronization signal Vsync. The plurality of gate signals GS are provided to the plurality of gate lines GL1 to GLn, respectively, at every subframe period SFR1 to SFR4.

The data driver 600 (see FIG. 1) may generate a plurality of data voltages DS corresponding to the plurality of image data RGB-C, based on a horizontal synchronization signal Hsync. The data driver 600 outputs the data voltages DS to the data lines DL1 to DLm during each horizontal period. Each of the plurality of pixels PX1, PX2, and PX3 (see FIG. 1) sequentially receives four data voltages corresponding to four image data during the first to fourth subframe periods SFR1 to SFR4.

The backlight driver 300 may output switching signals SW-S. In FIG. 5, first to third switching signals SW-S1, SW-S2, and SW-S3 for respectively switching the first to third light emitting elements LED-R, LED-G, and LED-B included in one light source block B1_1 (see FIG. 4) have been illustrated as an example, but the inventive concept is not limited thereto. Each of the first to third switching signals SW-S1, SW-S2, and SW-S3 includes at least one high period having a high level and at least one low period having a low level.

The first to third light emitting elements LED-R, LED-G, and LED-B may be turned on to correspond to the high periods of the first to third switching signals SW-S1, SW-S2, and SW-S3, respectively. The first to third light emitting elements LED-R, LED-G, and LED-B may be turned off to correspond to the low periods of the first to third switching signals SW-S1, SW-S2, and SW-S3, respectively. The first to third light emitting elements LED-R, LED-G, and LED-B may be selectively turned on/off during some subframe periods among the first to fourth subframe periods SFR1 to SFR4. The first to third light emitting elements LED-R, LED-G, and LED-B may be concurrently (e.g., simultaneously) turned on during a specific subframe period, e.g., the fourth subframe period SFR4.

Although it is illustrated that the high and low periods of the first to third switching signals SW-S1, SW-S2, and SW-S3 are divided to correspond to the first to fourth subframe periods SFR1 to SFR4, the high and low periods of the first to third switching signals SW-S1, SW-S2, and SW-S3 are not limited thereto. For example, the high periods of the first to third switching signals SW-S1, SW-S2, and SW-S3 may correspond to a portion of any one subframe period among the first to fourth subframe periods SFR1 to SFR4. That is, the first to third light emitting elements LED-R, LED-G, and LED-B may be turned on during a portion of any one subframe period.

Figure 6A:
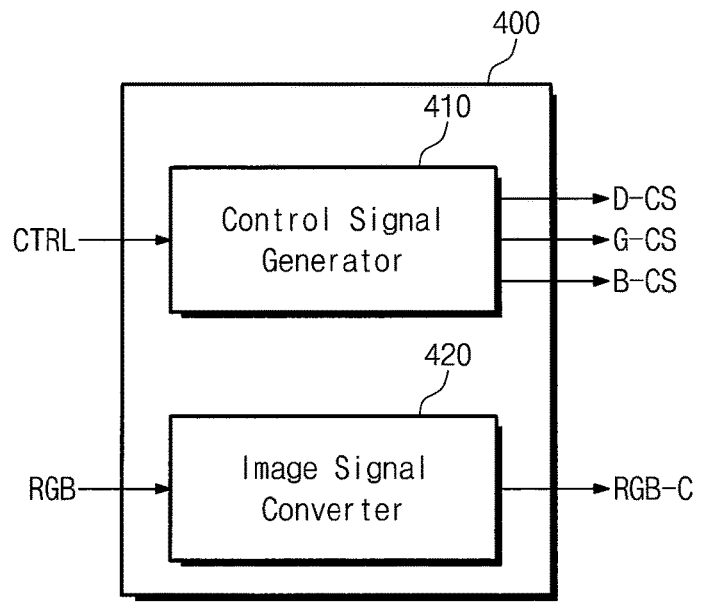
FIG. 6A is a block diagram of a signal controller according to an embodiment of the inventive concept.
Figure 6B:
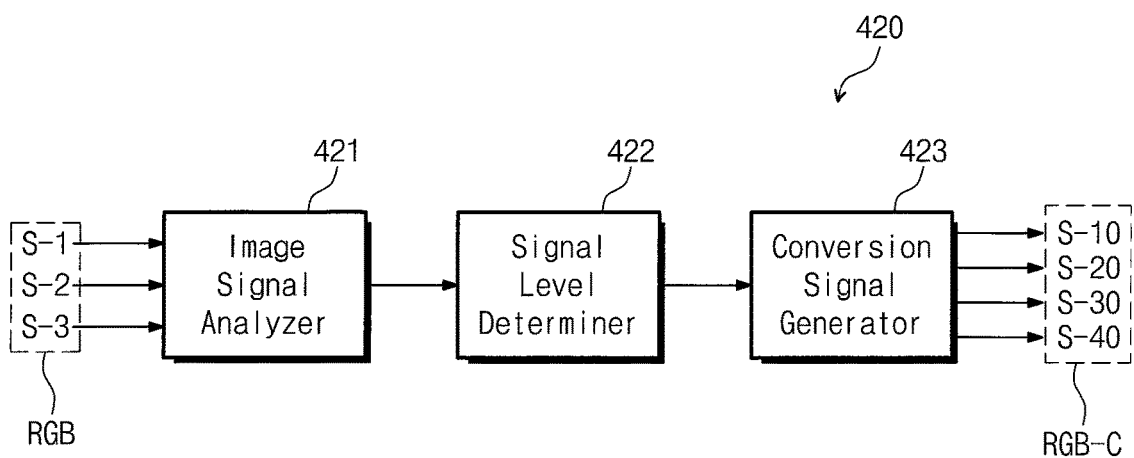
FIG. 6B is a block diagram of an image signal converter according to an embodiment of the inventive concept.
Figure 7:
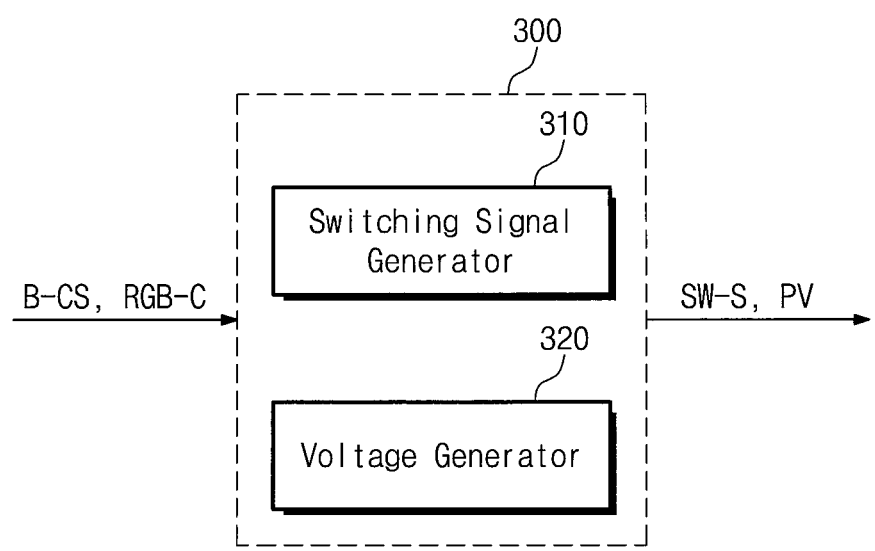
FIG. 7 is a block diagram of a backlight driver according to an embodiment of the inventive concept.

FIG. 6A is a block diagram of the signal controller according to an embodiment of the inventive concept. FIG. 6B is a block diagram of an image signal converter according to an embodiment of the inventive concept. FIG. 7 is a block diagram of the backlight driver according to an embodiment of the inventive concept.

As shown in FIG. 6A, the signal controller 400 may include a control signal generator 410 and an image signal converter 420. The control signal generator 410 generates a data control signal D-CS, a gate control signal G-CS, and a backlight control signal B-CS based on a control signal CTRL input thereto. The image signal converter 420 converts a plurality of input image signals RGB into a plurality of image data RGB-C.

As shown in FIG. 6B, the image signal converter 420 generates first to fourth image data S-10, S-20, S-30, and S-40 from first to third input image signals S-1, S-2, and S-3. The first to third input image signals S1, S2, and S3 include color information, e.g., predetermined color information on red, green, and blue colors, respectively. Each of the plurality of input image signals RGB includes the first to third input image signals S-1, S-2, and S-3, and each of the plurality of image data RGB-C includes the first to fourth image data S-10, S-20, S-30, and S-40.

A plurality of image signals RGB corresponding to one frame image are matched to a plurality of pixels, respectively. One image signal RGB matched to one pixel may include the first to third input image signals S-1, S-2, and S-3. The one image signal RGB is converted into one image data RGB-C, and the one image data RGB-C includes the first to fourth image data S-10, S-20, S-30, and S-40.

According to an embodiment, two image data among the first to fourth image data S-10, S-20, S-30, and S-40 may include color information on two of the red, green, and blue colors, respectively. The other two image data among the first to fourth image data S-10, S-20, S-30, and S-40 may include information on white.

According to an embodiment, one image data among the first to fourth image data S-10, S-20, S-30, and S-40 may include color information on one (e.g., blue) of the red, green, and blue colors. Other two image data among the first to fourth image data S-10, S-20, S-30, and S-40 may include color information on another (e.g., green) of the red, green, and blue colors, which is different from that of the one image data. The remaining one image data among the first to fourth image data S-10, S-20, S-30, and S-40 may include color information on a fourth color different from the red, green, and blue colors. The fourth color may be a mixed color (e.g., magenta) of two colors (e.g., the red and blue colors) different from that of the one image data.

The image signal converter 420 may include an image signal analyzer 421, a signal level determiner 422, and a conversion signal generator 423.

The image signal analyzer 421 analyzes information on a plurality of image signals RGB corresponding to one frame image. The image signal analyzer 421 analyzes luminance values of image signals, e.g., luminance values of the first to third input image signals S-1, S-2, and S-3. In addition, the image signal analyzer 421 may analyze histograms of the image signals, a correlation of the red, green, and blue colors, a distribution of the image signals, and/or the like.

The image signal analyzer 421 may divide the plurality of image signals RGB into a plurality of groups to correspond to the plurality of dimming areas D1_1 to Dn_4, and may analyze information of the first to third input image signals S-1, S-2, and S-3 in units of groups. A method for converting image signals RGB of a plurality of image signal groups may be variously selected depending on a distribution of color information included in image signals RGB of each of the plurality of image signal groups.

The signal level determiner 422 determines luminance values of the first to fourth image data S-10, S-20, S-30, and S-40 from the analyzed luminance values. The method for determining the luminance values of the first to fourth image data S-10, S-20, S-30, and S-40 will be described in more detail later. The conversion signal generator 423 generates the first to fourth image data S-10, S-20, S-30, and S-40 based on the determined luminance values.

As shown in FIG. 7, the backlight driver 300 receives a backlight control signal B-CS and image data RGB-C, and outputs a switching signal SW-S and a power voltage PV.

The backlight driver 300 may include a switching signal generator 310 for generating the switching signal SW-S and a voltage generator 320 for generating the power voltage PV.

The switching signal generator 310 generate the switching signal SW-S based on the backlight control signal B-CS and the image data RGB-C. The switching signal generator 310 may generate the switching signal SW-S by analyzing the image data RGB-C, e.g., color information of the first to fourth image data S-10, S-20, S-30, and S-40 of each of the image data RGB-C. The switching signal generator 310 may divide the image data RGB-C into a plurality of image data groups to correspond to the plurality of dimming areas D1_1 to Dn_4, and may analyze the color information of the first to fourth image data S-10, S-20, S-30, and S-40 in units of image data groups. When the image data RGB-C of a corresponding image data group have similar color information (e.g., the same or substantially the same color information), the switching signal generator 310 may select specific image data RGB-C as representative image data, and may generate the switching signal SW-S based on color information of the representative image data.

The voltage generator 320 converts an input voltage (e.g., analog voltage) to be suitable for operations of the light emitting elements, and outputs the converted voltage. The voltage generator 320 may include a DC-DC converter.

Figure 8A:
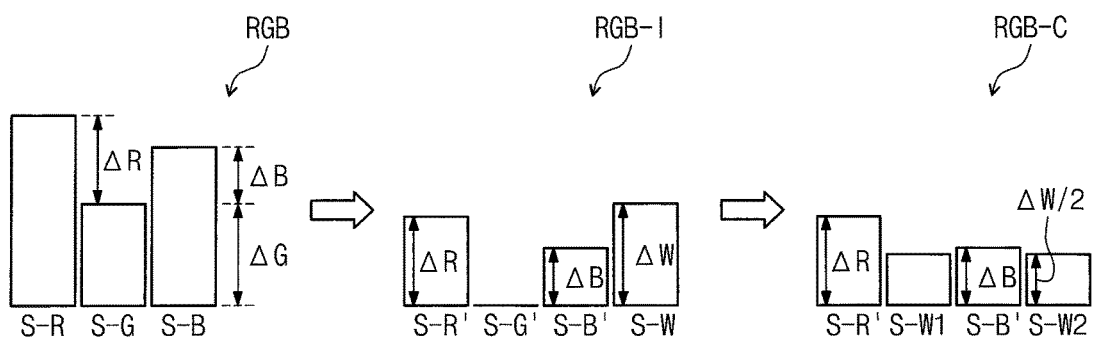
FIG. 8A is a diagram illustrating a process in which image data are converted from input image signals according to an embodiment of the inventive concept.
Figure 8B:
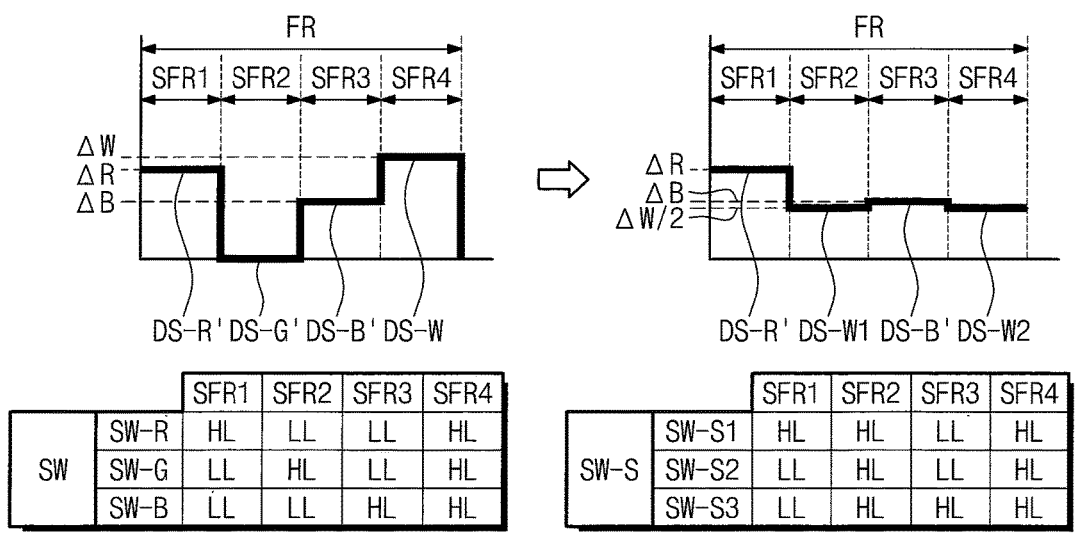
FIG. 8B is a diagram illustrating a relationship between data voltages and switching signals according to an embodiment of the inventive concept.

FIG. 8A is a diagram illustrating a process in which image data are converted from input image signals according to an embodiment of the inventive concept. FIG. 8B is a diagram illustrating a relationship between data voltages and switching signals according to an embodiment of the inventive concept. Hereinafter, the image signal converter 420 and the backlight driver 300, which are described with reference to FIGS. 6A to 7, will be described in more detail with reference to FIGS. 8A and 8B. In this embodiment, the first to third input image signals S-1, S-2, and S-3 described with reference to FIGS. 6A to 7 are described as a red input image signal S-R, a green input image signal S-G, and a blue input image signal S-B, which have information on the red, green, and blue colors, respectively.

As shown in FIG. 8A, the red input image signal S-R, the green image signal S-G, and the blue input image signal S-B have luminance values (e.g., predetermined luminance values). Each of the luminance values may have any one of 0 to 255 grayscales values. For convenience of illustration, the luminance values are shown as bar graphs.

The image signal analyzer 421 (see FIG. 6B) compares and analyzes luminance values of the red input image signal S-R, the green image signal S-G, and the blue input image signal S-B. The image signal analyzer 421 selects an input image signal having the minimum luminance value (hereinafter, referred to as a minimum input image signal) from among the red input image signal S-R, the green image signal S-G, and the blue input image signal S-B. When the number of input image signals having the minimum luminance value is two or more, the image signal analyzer 421 may select (e.g., arbitrarily select) any one of the input image signals.

The image signal analyzer 421 calculates a luminance value $\Delta G$ of the minimum input image signal, and calculates luminance difference values $\Delta R$ and $\Delta B$ between the minimum input image signal and the other two input image signals. In one embodiment, for example, the image signal analyzer 421 calculates a luminance value $\Delta G$ of the green input image signal S-G, a luminance difference value $\Delta R$ between the red input image signal S-R and the green input image signal S-G, and a luminance difference value ΔB between the blue input image signal S-B and the green input image signal S-G.

The signal level determiner 422 determines color information and luminance values of image data RGB-C based on the analyzed luminance values ΔG, ΔR, and ΔB. When the minimum luminance value ΔG is not equal to 0, the signal level determiner 422 determines a white luminance value ΔW based on the minimum luminance value ΔG, and determines color information and luminance values ΔW/2 of two image data S-W1 and S-W2 based on the white luminance value ΔW. The two image data S-W1 and S-W2 may include information on white, and the luminance value ΔW/2 may correspond to a half of the minimum luminance value ΔG.

The signal level determiner 422 determines color information and a luminance value ΔR of another image data S-R', and color information and a luminance value ΔB of the remaining one image data S-B', based on the luminance difference values ΔR and ΔB between the minimum input image signal and the other two input image signals. The other image data S-R' has color information (e.g., the red color) of one (e.g., the red input image signal S-R) of the other two input image signals, and has, as a luminance value, a luminance difference value ΔR between the one input image signal and the minimum input image signal S-G. The remaining one image data S-B' has color information (e.g., the blue color) of the other (e.g., the blue input image signal S-B) of the other two input image signals, and has, as a luminance value, a luminance difference value ΔB between the other input image signal and the minimum input image signal S-G.

The conversion signal generator 423 generates first to fourth image data S-R', S-W1, S-B', and S-W2 based on the color information and luminance values determined in the signal level determiner 422.

In FIG. 8B, a switching signal SW according to a comparative example and a switching signal SW-S according to an embodiment of the inventive concept are compared and illustrated. In FIG. 8B, data voltages DS-R', DS-G', DS-B', and DS-W according to the comparative example and data voltages DS-R', DS-W1, DS-B', and DS-W2 are illustrated.

According to the comparative example, the data voltages DS-R', DS-G', DS-B', and DS-W are formed based on middle image data RGB-I (see FIG. 8A). As shown in the switching signal SW, the first to third light emitting elements LED-R, LED-G, and LED-B (see FIG. 4B) are sequentially turned on during the first to third subframe periods SFR1 to SFR3. The first to third light emitting elements LED-R, LED-G, and LED-B emit light during only a corresponding subframe period among the first to third subframe periods SFR1 to SFR3. The pixel PX (see FIGS. 2A and 2B) sequentially receives light of the red, green, and blue during the first to third subframe periods SFR1 to SFR3.

The first to third light emitting elements LED-R, LED-G, and LED-B are concurrently (e.g., simultaneously) turned on during the fourth subframe period SFR4. The pixel PX receives white light during the fourth subframe period SFR4.

The pixel PX (see FIGS. 2A and 2B) transmits the light received during the first to fourth subframe periods SFR1 to SFR4 to correspond to the data voltages DS-R', DS-G', DS-B', and DS-W. The amount of the transmitted light is determined according to levels of the data voltages DS-R', DS-G', DS-B', and DS-W.

According to an embodiment, the data voltages DS-R', DS-W1, DS-B', and DS-W2 are formed based on first to fourth image data S-R', S-W1, S-B', and S-W2. In order to form an image corresponding to the first to fourth image data S-R', S-W1, S-B', and S-W2, at least one of the first to third light emitting elements LED-R, LED-G, and LED-B is turned on during the first to fourth subframe periods SFR1 to SFR4.

In addition, the first to third light emitting elements LED-R, LED-G, and LED-B are controlled to provide light of the same or substantially the same color to the pixel PX during two subframe periods from among the first to fourth subframe periods SFR1 to SFR4. The light of the same or substantially the same color may be generated by one light emitting element from among the first to third light emitting elements LED-R, LED-G, and LED-B, and/or may be generated by two or more light emitting elements from among the first to third light emitting elements LED-R, LED-G, and LED-B. According to the comparative example, light of the red, green, blue, and white colors that are different from one another are provided during the first to fourth subframe periods SFR1 to SFR4.

As shown in the switching signal SW-S, the first to third light emitting elements LED-R, LED-G, and LED-B are respectively turned on during the first and third subframe periods SFR1 and SFR3. The first to third light emitting elements LED-R, LED-G, and LED-B are concurrently (e.g., simultaneously) turned on during the second and fourth subframe periods SFR2 and SFR4. The pixel PX transmits the received light of the red color during the first subframe period SFR1. The pixel PX transmits the received light of the blue color during the third subframe period SFR3. The pixel PX transmits the received light of the white color during the second and fourth subframe periods SFR2 and SFR4. The amount of the transmitted light is determined according to levels of the data voltages DS-R', DS-W1, DS-B', and DS-W2.

The switching signal generator 310 (see FIG. 7) generates the switching signal SW-S based on color information of the first to fourth image data S-R', S-W1, S-B', and S-W2. The high and low periods of the first to third switching signals SW-S1, SW-S2, and SW-S3 may be determined according to an order in which the first to fourth image data S-R', S-W1, S-B', and S-W2 are arranged.

As described above, the pixel PX transmits light during each of the first to fourth subframe periods SFR1 to SFR4. Thus, no subframe period is generated during which light is not transmitted through the pixel PX. Since the luminance differences between the first to fourth subframe periods SFR1 to SFR4 decrease, flickers may be reduced.

Figure 9A:
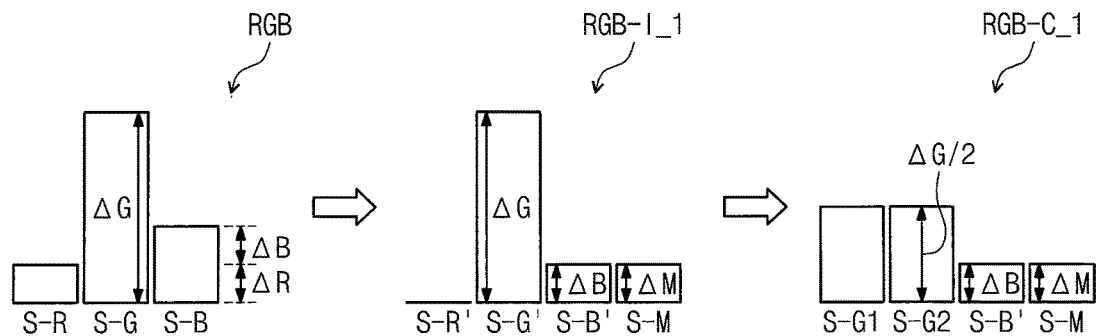
FIG. 9A is a diagram illustrating a process in which image data are converted from input image signals according to an embodiment of the inventive concept.
Figure 9B:
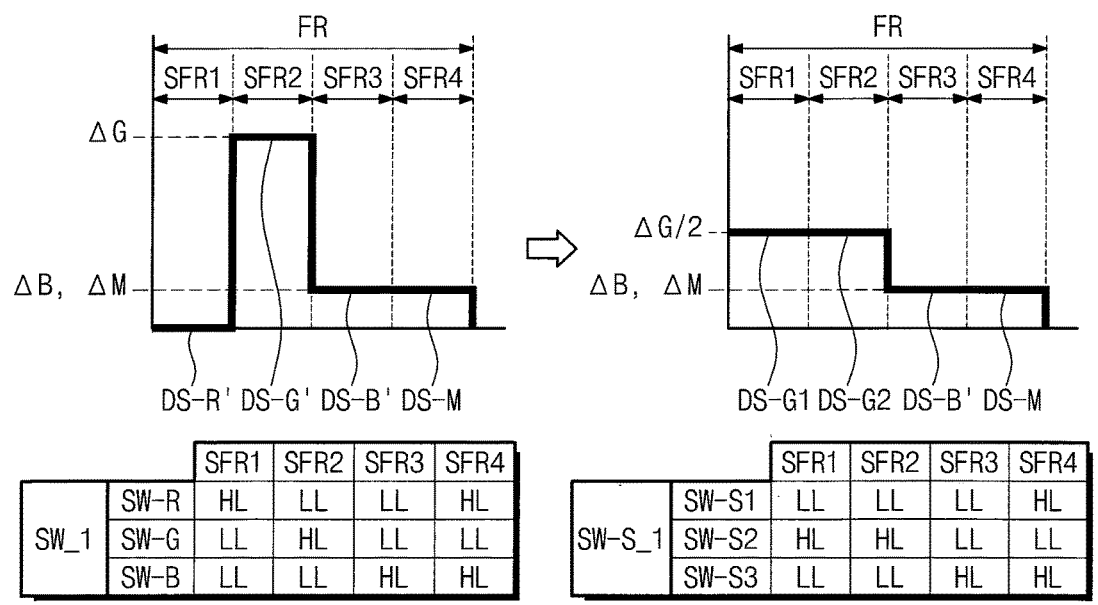
FIG. 9B is a diagram illustrating a relationship between data voltages and switching signals according to an embodiment of the inventive concept.
Figure 9C:
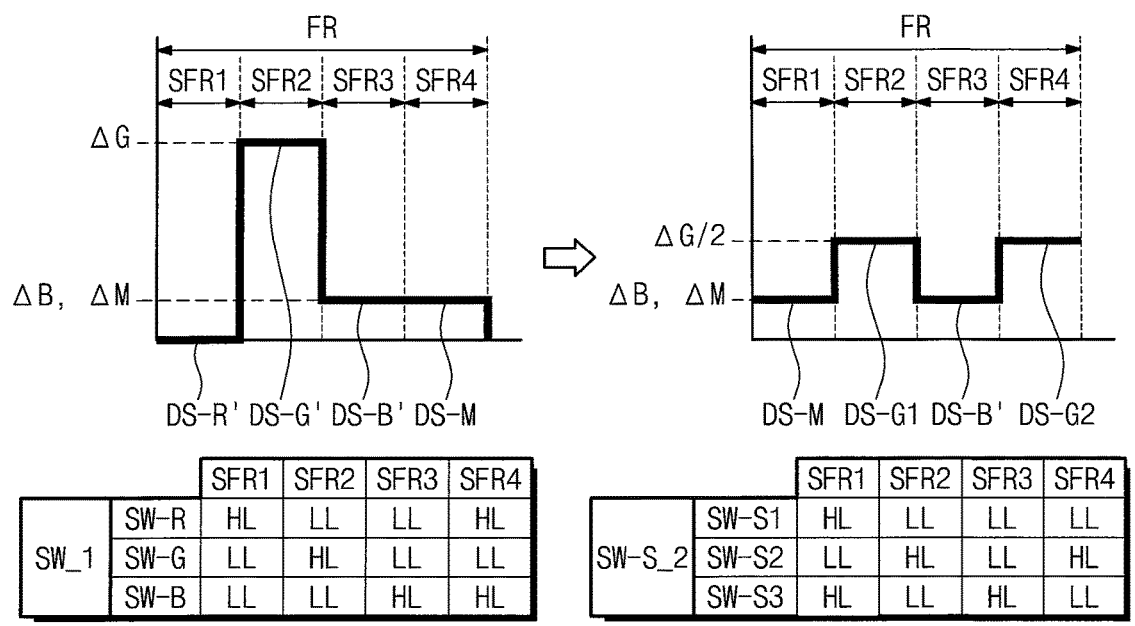
FIG. 9C is a diagram illustrating a relationship between data voltages and switching signals according to an embodiment of the inventive concept.

FIG. 9A is a diagram illustrating a process in which image data are converted from input image signals according to an embodiment of the inventive concept. FIG. 9B is a diagram illustrating a relationship between data voltages and switching signals according to an embodiment of the inventive concept. FIG. 9C is a diagram illustrating a relationship between data voltages and switching signals according to an embodiment of the inventive concept. Hereinafter, the image signal converter 420 and the backlight driver 300 will be described in more detail with reference to FIGS. 9A to 9C. In FIGS. 9A to 9C, detailed descriptions of components that are the same or substantially the same to those described with reference to FIGS. 1 to 8B may be omitted.

As shown in FIG. 9A, the red input image signal S-R, the green input image signal S-G, and the blue input image signal S-B have luminance values (e.g., predetermined luminance values). The image signal analyzer 421 (see FIG. 6B) selects an input image signal having the minimum luminance value (hereinafter, referred to as a minimum input image signal) and an input image signal having the maximum luminance value (hereinafter, referred to as a maximum input image signal) from among the red input image signal S-R, the green input image signal S-G, and the blue input image signal S-B. When the number of input image signals having the minimum luminance value is two or more, the image signal analyzer 421 may select (e.g., arbitrarily select) any one of the input image signals. When the number of input image signals having the maximum luminance value is two or more, the image signal analyzer 421 may select (e.g., arbitrarily select) any one of the input image signals.

The image signal analyzer 421 calculates a luminance value ΔR of the minimum input image signal, and calculates a luminance value ΔG of the maximum input image signal. The image signal analyzer 421 calculates a luminance difference value ΔB between the minimum input image signal S-R and the remaining one input image signal S-B. In this embodiment, the image signal analyzer 421 calculates the luminance value ΔR of the red input image signal S-R, the luminance value ΔG of the green input image signal S-G, and the luminance difference value ΔB between the blue input image signal S-B and the red input image signal S-R.

The signal level determiner 422 determines color information and luminance values of image data RGB-C_1 based on the analyzed luminance values ΔG, ΔR, and ΔB. When the minimum luminance value ΔR is not 0, the signal level determiner 422 determines a luminance value ΔM of any one image data S-M based on the minimum luminance value ΔR. The any one image data may have information on a fourth color. The fourth color may be a mixed color (e.g., magenta) of colors (e.g., red and blue) of other two input image signals except the maximum input image signal from among the red input image signal S-R, the green input image signal S-G, and the blue input image signal S-B.

The signal level determiner 422 determines color information and luminance values ΔG/2 of other two image data S-W1 and S-W2 based on the maximum luminance value ΔG. The two image data S-W1 and S-W2 may have the same color information as the maximum input image signal, and the luminance value ΔG/2 may correspond to a half of the maximum luminance value ΔG. The signal level determiner 422 determines color information and a luminance value ΔB of the other one image data S-B' based on the luminance difference value ΔB. The remaining one image data S-B' has color information of the remaining input image signal S-B, and has the luminance difference value ΔB as a luminance value.

The conversion signal generator 423 generates first to fourth image data S-G1, S-G2, S-B', and S-M based on the color information and luminance values determined in the signal level determiner 422.

In FIG. 9B, a switching signal SW_1 according to a comparative example and a switching signal SW-S_1 according to an embodiment of the inventive concept are compared and illustrated. In FIG. 9B, data voltages DS-R', DS-G', DS-B', and DS-M according to the comparative example and data voltages DS-G1, DS-G2, DS-B', and DS-M according to an embodiment of the inventive concept are illustrated.

According to the comparative example, the data voltages DS-R', DS-G', DS-B', and DS-M are formed based on middle image data RGB-I_1 (see FIG. 9A). As shown in the switching signal SW_1, the first to third light emitting elements LED-R, LED-G, and LED-B (see FIG. 4B) are sequentially turned on during the first to third subframe periods SFR1 to SFR3. The first and third light emitting elements LED-R, and LED-B are concurrently (e.g., simultaneously) turned on during the fourth subframe period SFR4. The pixel PX (see FIGS. 2A and 2B) transmits received light to correspond to the data voltages DS-R', DS-G', DS-B', and DS-M during the first to fourth subframe periods SFR1 to SFR4.

According to an embodiment of the inventive concept, the data voltages DS-G1, DS-G2, DS-B', and DS-M are formed based on first to fourth image data S-G1, S-G2, S-B', and S-M. As shown in the switching signal SW-S, the second light emitting element LED-G is turned on during the first and second subframe periods SFR1 and SFR2. The third light emitting element LED-B is turned on during the third subframe period SFR3. The first and third light emitting elements LED-R and LED-B are turned on during the fourth subframe period SFR4. The pixel PX transmits received light of the green color during the first and second subframe periods SFR1 and SFR2. The pixel PX transmits received light of the blue color during the third subframe period SFR3. The pixel PX transmits received light of the magenta color (e.g., mixed color of red and blue) during the fourth subframe period SFR4. The amount of the transmitted light is determined according to levels of the data voltages DS-G1, DS-G2, DS-B', and DS-M.

As described above, the pixel PX transmits light during each of the first to fourth subframe periods SFR1 to SFR4. Thus, no subframe period is generated during which light is not transmitted through the pixel PX. Since the luminance differences between the first to fourth subframe periods SFR1 to SFR4 decrease, flickers may be reduced.

In FIG. 9C, a switching signal SW_1 according to a comparative example and a switching signal SW-S_2 according to an embodiment of the inventive concept are compared and illustrated. In FIG. 9C, data voltages DS-R', DS-G', DS-B', and DS-M according to the comparative example are the same or substantially the same as those of the data voltages DS-R', DS-G', DS-B', and DS-M according to the comparative example shown in FIG. 9B. According to this embodiment of the inventive concept, the order in which data voltages DS-G1, DS-G2, DS-B', and DS-M are applied to the pixel is different from the order in which the data voltages DS-G1, DS-G2, DS-B', and DS-M shown in FIG. 9B are applied to the pixel.

The signal level determiner 422 may determine an order of the first to fourth image data S-G1, S-G2, S-B', and S-M. The first to fourth image data S-G1, S-G2, S-B', and S-M may be arranged such that the two image data S-G1 and S-G2 are not consecutive. The pixel PX may transmit the received light of the green color during the second and fourth subframe periods SFR2 and SFR4 which are not consecutive.

When the minimum luminance value ΔR (see FIG. 9A) is equal to or substantially equal to the luminance difference value ΔB between the minimum input image signal S-R and the remaining one input image signal S-B, e.g., when the minimum luminance value ΔR and the luminance difference value ΔB have the same grayscale level or a grayscale level difference of 5 or less, the first to fourth image data S-G1, S-G2, S-B', and S-M may be arranged such that the two image data S-G1 and S-G2 are not consecutive.

According to FIG. 9B, it may be assumed that the luminance difference of light transmitted through the pixel PX is generated at a frequency of about 120 Hz. On the other hand, according to FIG. 9C, it may be assumed that the luminance difference of light transmitted through the pixel PX is generated at a frequency of about 240 Hz. Since the flicker is in inverse proportion to the frequency, the display quality of the display apparatus may be further improved.

According to an embodiment of the inventive concept, the pixel transmits light during the first to fourth subframe periods. Thus, no subframe period is generated during which light is not transmitted through the pixel. Since the luminance differences between the subframe periods decrease, flickers may be reduced.

In the drawings, the relative sizes of elements, layers, and regions may be exaggerated for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

While the present disclosure has been described in connection with the aforementioned embodiments, it will be understood by those skilled in the art that various modifications and changes can be made thereto, without departing from the spirit and scope of the inventive concept as defined by the appended claims, and their equivalents. The embodiments disclosed in the present disclosure should not be construed as limiting the technical spirit of the inventive concept. The technical spirit within the scope substantially identical with the scope of the inventive concept will be considered to fall in the scope of the inventive concept defined by the appended claims, and their equivalents.

What is claimed is:

1. A display apparatus comprising:
   a signal controller configured to generate first to fourth image data from first to third input image signals, the first to third input image signals having first to third color information, respectively;

a pixel configured to subsequently receive first to fourth data voltages corresponding to the first to fourth image data during first to fourth subframe periods;

a backlight comprising first to third light emitting elements configured to generate light of first to third colors, respectively; and a backlight driver configured to drive the first to third light emitting elements, wherein the backlight driver is configured to selectively switch the first to third light emitting elements based on color information of the first to fourth image data, to turn on at least one of the first to third light emitting elements during each of the first to fourth subframe periods, and to switch the first to third light emitting elements to provide light of a same color to the pixel during two subframe periods from among the first to fourth subframe periods.

2. The display apparatus of claim 1, wherein the pixel is configured to transmit light of the same color as that of light received during the first to fourth subframe periods based on the first to fourth data voltages.

3. The display apparatus of claim 2, wherein the pixel comprises:
a thin film transistor configured to output the first to fourth data voltages;
a pixel electrode connected to the thin film transistor;
a common electrode configured to form an electric field with the pixel electrode; and
a liquid crystal layer configured to change an arrangement corresponding to the electric field.

4. The display apparatus of claim 1, further comprising an image signal converter configured to generate the first to fourth image data from the first to third input image signals,
wherein the image signal converter is configured to generate two white image data having white information from among the first to fourth image data according to one input image signal having a minimum luminance value from among the first to third input image signals, and to generate other two image data from among the first to fourth image data respectively having corresponding color information from other two input image signals from among the first to third input image signals.

5. The display apparatus of claim 4, wherein the other two image data have color information on different colors from among red, green, and blue colors.

6. The display apparatus of claim 5, wherein the two white image data have the same luminance value.

7. The display apparatus of claim 6, wherein the first to third light emitting elements are configured to generate light of the red, green, and blue colors, respectively.

8. The display apparatus of claim 7, wherein light emitting elements that generate light of colors corresponding to the color information of the other two image data from among the first to third light emitting elements are configured to be turned on during two subframe periods from among the first to fourth subframe periods during which data voltages corresponding to the other two image data are applied to the pixel.

9. The display apparatus of claim 7, wherein the first to third light emitting elements are configured to be concurrently turned on during other two subframe periods from among the first to fourth subframe periods during which data voltages corresponding to the two white image data are applied to the pixel.

10. The display apparatus of claim 4, wherein the image signal converter comprises:

an image signal analyzer configured to analyze luminance values of the first to third input image signals;
a signal level determiner configured to determine luminance values of the two white image data from the analyzed luminance values, and to determine luminance values of the other two image data; and
a conversion signal generator configured to generate the first to fourth image data based on the determined luminance values.

11. The display apparatus of claim 1, further comprising an image signal converter configured to generate the first to fourth image data from the first to third input image signals,
wherein the image signal converter is configured to generate one image data having color information on a fourth color different from the first to third colors of the first to third input image signals from among a minimum input image signal having a minimum luminance value from among the first to third input image signals, to generate two image data having the same color information from a maximum input image signal having a maximum luminance value from among the first to third input image signals, and to generate remaining one image data having corresponding color information from a remaining one input image signal from among the first to third input image signals.

12. The display apparatus of claim 11, wherein the first to third colors of the first to third input image signals are red, green, and blue, respectively.

13. The display apparatus of claim 12, wherein the two image data having the same color information as the maximum input image signal have a same luminance value with each other.

14. The display apparatus of claim 12, wherein the one image data having the information on the fourth color has information on a mixed color including the color of the color information of the minimum input image signal and the color of the color information of the remaining one input image signal.

15. The display apparatus of claim 14, wherein the first to third light emitting elements are configured to generate light of the red, green, and blue colors, respectively.

16. The display apparatus of claim 15, wherein one light emitting element configured to generate light of a color corresponding to that of the color information of the minimum input image signal and another light emitting element configured to generate light of a color corresponding to that of the color information of the remaining one input image signal from among the first to third light emitting elements are configured to be concurrently turned on during one subframe period from among the first to fourth subframe periods during which a data voltage corresponding to the image data having the color information on the fourth color is applied to the pixel.

17. The display apparatus of claim 15, wherein a remaining one light emitting element configured to generate light of a color corresponding to that of the color information of the maximum input image signal from among the first to third light emitting elements is configured to be turned on during each of other two subframe periods from among the first to fourth subframe periods during which data voltages corresponding to the two image data having the same color information as the maximum input image signal are applied to the pixel.

18. The display apparatus of claim 17, wherein the other two subframe periods are two discrete periods from among the first to fourth subframe periods.

19. The display apparatus of claim 11, wherein the image signal converter comprises:
- an image signal analyzer configured to analyze luminance values of the first to third input image signals;
- a signal level determiner configured to determine luminance values of the image data having the color information on the fourth color from the analyzed luminance values, to determine luminance values of two image data having the same color information as the maximum input image signal, and to determine a luminance value of the remaining one image data having color information corresponding to the remaining one input image signal; and
- a conversion signal generator configured to generate the first to fourth image data based on the determined luminance values.

* * * * *